United States Patent [19]

Reynolds

[11] Patent Number: 4,874,190
[45] Date of Patent: Oct. 17, 1989

[54] SPECIALIZED HOSE CONNECTOR FOR CONNECTING HYDRAULIC HOSES AND PORTS OF DIFFERENT RATINGS

[75] Inventor: David W. Reynolds, Huxley, Iowa

[73] Assignee: Sundstrand Corporation, Rockford, Ill.

[21] Appl. No.: 142,107

[22] Filed: Jan. 11, 1988

[51] Int. Cl.⁴ ............................................. F16L 23/00
[52] U.S. Cl. ................................... 285/158; 285/368; 285/189
[58] Field of Search ............... 285/412, 413, 415, 368, 285/158, 159, 189

[56] References Cited

U.S. PATENT DOCUMENTS

| | | | |
|---|---|---|---|
| 2,681,817 | 6/1954 | Demlow . | |
| 2,749,149 | 6/1956 | Carpenter | 285/189 |
| 3,336,055 | 8/1967 | Pall et al. | 285/87 |
| 3,549,179 | 12/1970 | Cox | 285/189 |
| 3,600,012 | 8/1971 | Stafford | 285/413 |
| 3,850,455 | 11/1974 | Stafford | 285/114 |
| 4,023,836 | 5/1977 | Applehans | 285/368 |
| 4,225,161 | 9/1980 | Smith | 285/159 |
| 4,426,103 | 1/1984 | Sundholm | 285/12 |

OTHER PUBLICATIONS

SAE Standard J518c; May, 1972, 5 pages.
SAE Standard for Split Flange Connector from the 1956 SAE handbook, 1 page.

*Primary Examiner*—Thomas F. Callaghan
*Attorney, Agent, or Firm*—Wood, Dalton, Phillips Mason & Rowe

[57] ABSTRACT

The present invention is directed to a specialized hose end connector utilized for connecting a hydraulic hose dimensioned according to a first industry standard to a hydraulic port dimensioned according to a second industry standard. As one example meant for illustrative purposes only, the specialized hose end connector can secure a SAE Code 61 dimensioned hydraulic hose to a SAE Code 62 dimensioned hydraulic port. The specialized hose end connector eliminates the need for prior art adaptor plates and requires no extra labor steps or sealing surfaces than normally encountered in standard hose end connectors.

7 Claims, 2 Drawing Sheets

| APPROPRIATE DIMENSION DESIGNATION | | SAE CODE 61 (5000 PSI MAX) INCHES mm | | SAE CODE 62 (6000 PSI MAX) INCHES mm | |
|---|---|---|---|---|---|
| HOSE END FLANGED HEAD | A | 1.000 | 25.4 | 1.000 | 25.4 |
| | C | 1.750 | 44.45 | 1.875 | 47.63 |
| | H | 1.500 | 38 | 1.500 | 38 |
| | E | .315 | 8 | .375 | 9.53 |
| | K | .56 | 14 | .81 | 21 |
| HYDRAULIC PORT | A | 1.000 | 25.4 | 1.000 | 25.4 |
| | X | .52 | 13 | .55 | 14 |
| | W | 1.03 | 26 | 1.12 | 28 |
| | EE (MIN) | 1.88 | 48 | 2.12 | 54 |
| | FF | 2.31 | 59 | 2.75 | 70 |
| | O | 2.75 | 70 | 3.19 | 81 |
| | S (RADIUS) | .34 | 9 | .47 | 12 |
| | Z (THREAD) | 3/8-16 | | 7/16-14 | |
| SPLIT FLANGE CLAMP HALF | D | 1.781 | 45.24 | | |
| | J | 1.515 | 38.48 | | |
| | F | .295 | 7.49 | | |
| | U | | | .94 | 24 |
| | V | | | 1.31 | 33 |
| | O | | | 3.22-3.16 | 81.8-80.3 |
| | P | | | 1.33 | 33.8 |
| | Q | | | 2.250 | 57.15 |
| | R | | | .51 | 13 |
| | S (RADIUS) | | | .47 | 12 |
| | T (DIA) | | | .469 | 11.9 |
| | W | | | 1.125 | 28.58 |
| | X | | | .547 | 13.89 |

SPECIALIZED HOSE CONNECTOR FOR CONNECTING HYDRAULIC HOSES AND PORTS OF DIFFERENT RATINGS

FIELD OF THE INVENTION

The field of the present application are hose connectors, such as a split flange connector in the preferred example taught, which are used to connect high pressure hoses meeting a first industry standard to high pressure port meeting a different industry standard.

BACKGROUND OF THE INVENTION

It is well known in the hydraulic equipment industry to have a hose connector for securing a high pressure hose with, a high pressure port. Normally, hydraulic hoses meeting a certain industry pressure standard use connectors, such as a split flange connector, to join the hose to a high pressure port meeting the same industry standard. For example, a 6,000 psi hydraulic hose is joined to a 6,000 psi hydraulic port with both the hose flanged head and the hydraulic port being designed and dimensioned to meet the specific dimensions as set by the industry SAE Code 62 standard for 6,000 psi hydraulic hoses and ports. The split flange connector halves, such as taught by the U.S. Pat. No. 2,681,817 issued June 22, 1954, to Demlow, would have a bolt pattern and internal dimensions also meeting the industry SAE Code 62 standard for split flange clamp halves. SAE standard J518c, last revised in May, 1972 provides diagrams and appropriate dimensions for the hose flanged head, hydraulic port, and the split flange clamp halves.

In the hydraulic industry it is not unusual to encounter the intentional use of hydraulic hoses meeting one industry specification to connect hydraulic ports meeting a different industry specification. A prime example is the use of 5,000 psi rated hydraulic hoses (SAE Code (61) in certain lower pressure applications to form the closed loop of a hydrostatic transmission by connecting hydraulic units having ports designed to meet the industry 6,000 psi standard rating (SAE Code 62). The hydraulic unit manufacturer, for obvious reasons, designs the hydraulic unit ports so that the hydraulic unit can effectively be used in a system at the maximum pressure rating of the unit. However, the hydraulic unit is often used in applications not requiring such high pressures and the end user incorporates lower pressure rated hoses to interconnect the higher pressure designed hydraulic pump and motor units, especially when they are spaced at any significant difference. The end user selects such lower pressure rated hoses for both cost savings and inherent flexibility when compared to hydraulic hoses at various pressure ratings. While various pressure rated hoses are available, it is not industry practice to build hydraulic units at lower pressure ratings, or at higher pressure ratings with lower pressure rating ports, due to the extra tooling required and other complications such as multiple inventory.

It has therefore become industry practice to design the housing port sizes for the maximum pressure rating of the unit and to use an adaptor plate which receives a standard split flange connector and hydraulic hose flanged head dimensioned to a first industry standard and with the adaptor also having a second bolt pattern designed to fit a different industry standard hydraulic port specification. Thus an adaptor is designed to receive a 5,000 psi rated SAE Code 61 hose and split flange connector and at the same time patterned to connect to a 6,000 psi rated SAE Code 62 port. Unfortunately, such adaptors in themselves, while quite simple, are relatively expensive with prices ranging up to $50.00 as an after-market service part.

There have been hose clamps designed such as taught in U.S. Pat. No. 4,426,103, issued Jan. 17, 1984, to Sundholm, wherein specialized eccentric flange pieces are used and which are adaptable to receive more than one size of hose flanged head for connection of a low pressure hose to a hydraulic port. While such clamps provide some adaptability, this leads to certain compromises such as not surrounding the hose flanged head and thus does not lend itself to high pressure application.

SUMMARY OF THE INVENTION

The present invention is directed to the special design of a hydraulic hose connector so that such connector can receive a high pressure hose flanged head dimensioned according to a first standard rating and connect such hose to a high pressure hydraulic port dimensioned according to a second standard rating.

One object of the present invention is to provide a hydraulic hose connector which can receive a high pressure hose of a first standard rating and connect such hose to a hydraulic port of a second standard rating without the requirement of any additional parts such as required by the above mentioned adaptor plate.

Another object of the present invention is to provide a hydraulic hose connector which can receive a high pressure hose of a first standard rating and connect such hose to a high pressure hydraulic port of a second standard rating without the requirement of extra labor steps or extra sealing surfaces other than that normally required in connecting a hose to a hydraulic port by means of a standard hydraulic hose connector.

A further object of the present invention is to provide a hydraulic hose connector which is specifically adapted to receive a hydraulic hose dimensioned to a first standard pressure rating for connecting such hose to a hydraulic port dimensioned to a second standard rating with the connector only receiving hoses dimensioned to such first rating and only being connectable to hydraulic ports dimensioned to second rating whereby such hose connector can only be utilized with such specific hose/port combination. Preferably the connector is marked or identified relative to the hose/port combination intended for such connector.

Still a further object of the present invention is to provide a hydraulic hose connector which is adapted to connect a hydraulic hose dimensioned to a first standard pressure rating to a hydraulic port dimensioned to a second pressure rating and wherein such hydraulic hose connector cannot be used to connect a hose dimensioned to any industry standard pressure rating other than such first rating to a hydraulic port dimensioned to any industry standard other than such second rating.

Another object of the present invention is to provide a connector for connecting a fluid conduit of a first code standard to a fluid port of a second code standard without necessitating the use of a separate adaptor wherein the fluid conduit has a flanged head dimensioned according to the first code standard, the fluid port is dimensioned according to the second code standard, the connector has an opening dimensioned according to the first code standard for receiving the fluid conduit flanged head, and the connector has securing means positioned according to the second code standard and is adapted for connecting the connector to the fluid port.

Still a further object of the present invention is to provide a split flange connector adapted to secure a fluid conduit flanged head configured according to a first code standard to a hydraulic port configured according to a second code standard different than the first code standard wherein the split flanged connector consists of a pair of split flange clamp halves each having a semi-circular recess adapted to mate with a portion of a flanged head and has internal dimensions in accordance with the first code standard. Each of the clamp halves also have a pair of bolt receiving openings which are spaced according to the dimensions required by the second code standard whereby a fluid conduit flanged head dimensioned according to the first code standard can be directly mounted on a hydraulic port dimensioned according to the second code standard without the necessity for a separate adaptor and is secured by bolts passing through the bolt receiving openings in the clamp halves into bolt receiving apertures formed at the hydraulic port in accordance with the second code standard.

DESCRIPTION OF THE PREFERRED EMBODIMENT

Figure 1:
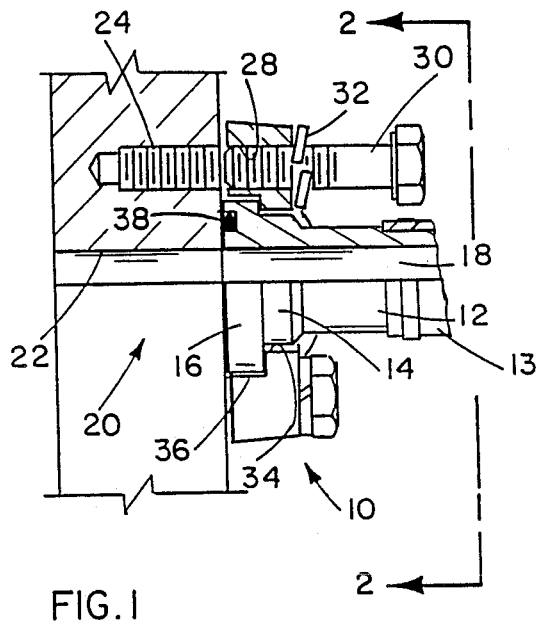
FIG. 1 is a side view, partly in section, of an assembled split flange connection showing the relationship between a hydraulic port, a high pressure hose flanged head, and split flanged clamp halves.

The hose connector of the present invention is designed to connect a hydraulic hose to a hydraulic port by securing a flanged head, carried by the hose, in face-to-face abutment with the hydraulic port, particularly when the hydraulic hose and hydraulic port are dimensioned to meet different standards. FIG. 1 shows an assembled split flange connection wherein a pair of split flange clamp halves form a hose connector 10 for securing a hose end piece 12, often referred to as a flanged head, to a hydraulic port. The flanged head 12 is secured to the hydraulic hose 13 as purchased and has two progressively larger diameter steps 14 and 16. The flanged head is also provided with a central bore 18 forming a fluid passageway. The flanged head is made in accordance with industry standards, such as SAE J518c, and is dimensioned in accordance with such standard for the pressure rating of the hose.

The hydraulic port 20 is formed integrally with a hydraulic unit such as a hydraulic pump or motor and includes a bore 22 generally the same diameter as bore 18 and aligned with bore 18 upon proper assembly. To assure such alignment, the hydraulic port 20 included four threaded bolt receiving apertures 24 (only one shown in FIG. 1) all positioned relative to the bore 22 in accordance with the industry standard for the hydraulic port. To assure that hydraulic hoses, regardless of source, can be properly connected to hydraulic ports of similar pressure ratings, the industry standards are quite specific as to the relative dimensions of the hose flanged head and the hydraulic port.

Figure 2:
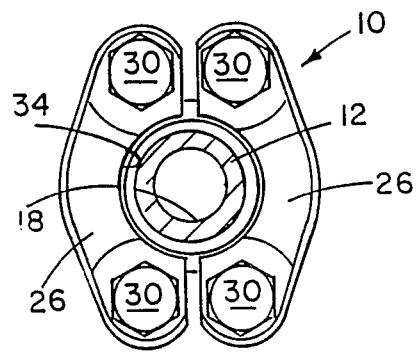
FIG. 2 is an end view, taken on line 2—2 of FIG. 1, showing the split flange clamp halves and hydraulic hose flanged head.

In the particular preferred embodiment taught in the drawings, the hose connector 10 is formed of two split flange clamp halves 26 as shown in the end view of FIG. 2. Each clamp half has a pair of bolt receiving openings 28 which are also specifically located in accordance with industry standards to assure that bolts 30 passing therethrough will be aligned with the port apertures 24. Lock washers 32 can be used with each bolt 30. Each clamp half 26 is also provided with a semi-circular recess 34 having a first diameter slightly larger than the diameter of the first step 14 of the flanged head 12. Each clamp half semi-circular recess 34 is further provided with a semi-circular step 36 which is slightly larger diameter than the second step 16 of the flanged head 12.

While single piece hose connectors are within the scope of the present invention, they require factory assembly at the time of manufacture of the hose due to the larger diameter of the flanged head. Therefore, it is much more common practice to use a hose connector which is of the two piece or split flanged clamp half type as shown in the drawings. The two clamp halves 26 are positioned around the flanged head 12 and the bolts 30 are used to secure the clamp halves 26 to the hydraulic port 20. Since all dimensions are quite specific according to the industry's standards, such as SAE J518c, there is a close physical relationship of all the parts with the bolts being properly aligned with the port bolt receiving opening 28 and apertures 24 and with a semi-circular recesses 34 and steps 34 and 36 assuring proper radial positioning of the flanged head 12 relative to the port 20 to assure that the bores 18 and 22 are aligned. As the bolt 30 are tightened, the semi-circular internal steps 36 cooperate with the external steps 16 of the flanged head 12 to draw the flanged head 12 against the hydraulic port 20 compressing an O-ring gasket 38 forming a high pressure seal. It is noted that the semi-circular recesses 34 of the two clamp halves 26 substantially completely surround the flanged head external steps 14 and 16 so as to distribute the applied forces and assure alignment.

Figure 3:
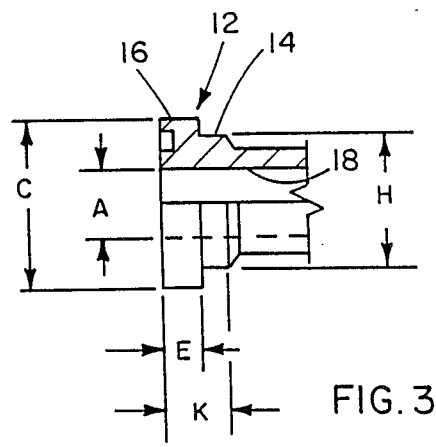
FIG. 3 is a side view partly in section showing the hydraulic hose flanged head along with pertinent dimensions thereof.
Figure 4:
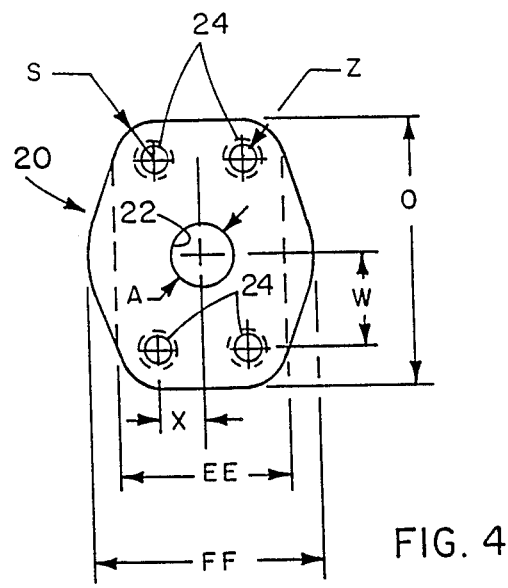
FIG. 4 is an end view of a hydraulic port showing pertinent dimensions thereof.
Figure 5:
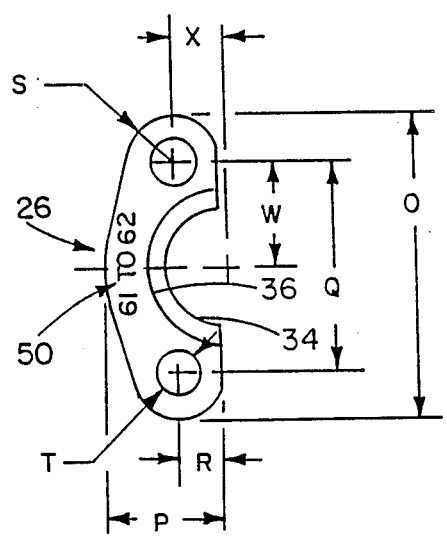
FIG. 5 is an end view of a split flange clamp half along with the appropriate dimensions thereof.
Figure 6:
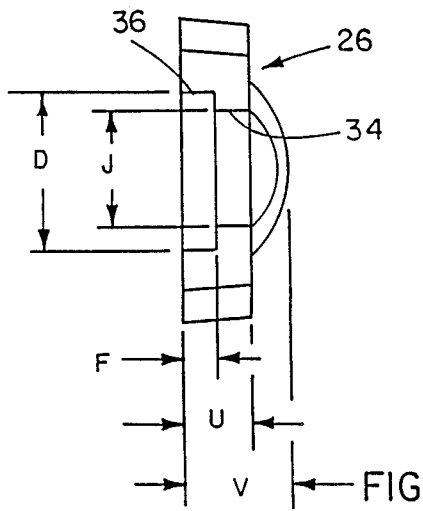
FIG. 6 is a side view of the split flange clamp half of FIG. 5 along with other appropriate dimensions thereof.

FIG. 3 shows the hose end flanged head 12 by itself with appropriate designated dimensions, while FIG. 4 shows end view of the hydraulic port 20 with specific designated dimensions. FIGS. 5 and 6 teach an end view and side view respectively of the split flange clamp half 26, two of which form hydraulic hose connector 10 of the preferred embodiment of the present invention. It is noted, for the example taught, that the flanged head 12 of FIG. 3 represents an SAE Code 61 flanged head for a hydraulic hose rated at 5,000 psi while FIG. 4 teaches an SAE Code 62 hydraulic port rated at 6,000 psi. The clamp half of FIGS. 5 and 6 has many dimensions, here referred to as external dimensions, meeting SAE Code 62 designated dimensions so as to mate with the hydraulic port 20 of FIG. 4 while at the same time having dimensions D, J and F, herein referred to as the internal dimensions, meeting SAE Code 61 dimensions so as to receive the SAE Code 61 flanged head 12 of FIG. 3.

Figures 7, 8A, 8B:
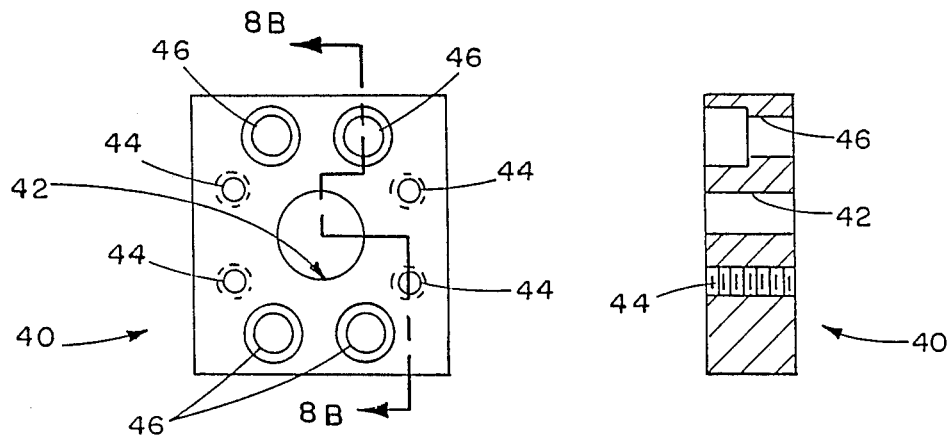
FIG. 7 is a chart showing the values of various dimensions for the nominal 1" (−16) hose flanged head and hydraulic port meeting both SAE Code 61 and SAE Code 62 standards and for a nominal 1" (−16)-split flange clamp half of the present invention having some dimensions according to the SAE Code 61 standard and other dimensions according to the SAE Code 62 standard.
FIGS. 8A and 8B are a front view and side view of an adaptor plate as used in the prior art for connecting the hydraulic hose flanged head of one SAE standard to a hydraulic port at a different SAE standard.

FIG. 7 is a chart showing numerical values for both SAE Code 61 and SAE Code 62 relative to appropriate dimension letter designations as shown both in the chart of FIG. 7 and in the views of FIGS. 3, 4, 5 and 6 for the flanged head, hydraulic port, and clamp half respectively. These dimension letter designations and values have been taken from SAE standard J518c, the hydraulic industry standard in the United States. For both the hose end flange head and hydraulic port, SAE Code 61 and SAE Code 62 numerical dimensions are provided according to SAE standard J518c for a nominal flange size of 1 inch. It is noted that appropriate dimension designation A, also represented by line bores 18 and 22 in FIG. 1, is 1 inch regardless of whether SAE Code 61 or SAE Code 62 applies. However, in all other cases dimensions for SAE Code 62 (rated at 6,000 psi maximum pressure) are larger than the same respective dimensions for SAE Code 61 (rated at 5,000 psi maximum pressure). The two sets of dimensions are provided for comparison purposes only since in the present example the flanged head uses SAE Code 61 numerical dimensions while the hydraulic port uses SAE Code 62 numerical dimensions.

It is noted that in FIG. 7 that the numerical dimensions for the clamp half dimension designations D, J and F (the internal dimensions) are shown as meeting SAE Code 61 standards, while the other dimensions designations for the clamp half (the external dimensions) are shown as meeting SAE Code 62 standards. This is done in accordance with the concept pointed out above that the internal dimensions of the clamp half meet the SAE Code 61 standards since they cooperate with appropriate dimensions of the SAE Code 61 flanged head. Similarly the external dimensions of the clamp half are dimensions according to SAE Code 62 since they must cooperate with appropriate dimensions the SAE Code 62 hydraulic port.

FIGS. 8A and 8B show a prior art adaptor plate 40 currently used in the industry to permit connection of a hydraulic hose end flanged head dimensioned according to a first industry standard, such as flanged head 12 in FIG. 3, having SAE Code 61 dimensions, to a hydraulic port dimensioned according to a second industry standard, such as the hydraulic port 20 FIG. 4 dimensioned according to the SAE Code 62 standard. In this manner, a 5,000 psi rated hose can be connected to a 6,000 psi rated port. With the use of the adaptor plate 40, having a central opening 42 of a diameter equal to the appropriate dimension a (1 inch in the present example), split flange clamp halves with all dimensions according to SAE Code 61 connect a hose flanged head to the adaptor plate by bolts entering adaptor plate threaded apertures 44 spaced according to SAE Code 61 dimensions X and W. A separate set of four bolts passing through adaptor plate openings 46 spaced according to SAE Code 62 dimensions X and W secure the adaptor plate, with the attached flange head, to the SAE Code 62 hydraulic port. It is noted that the use of the adaptor plate 40 requires the labor steps of securing two sets of four bolts and also requires two sealed surfaces, one between the adaptor plate 40 and the flanged head 12 and another between the adaptor plate 40 and the hydraulic port 20. The use of the specialized hose connector of the present invention eliminates the need for an adaptor plate as well as the extra labor steps and sealing surfaces.

The specialized connector 10 of the present invention, since the internal dimensions are according to a first industry standard and the external dimensions are according to a second industry standard, can only be used to connect a hydraulic hose dimensioned according a first industry standard to a hydraulic port dimensioned according to a second industry standard. Therefore, the connector cannot be used where the respective standards are reversed. However, this does not mean that another specialized hose end connector, according to the present invention, cannot be made with the reversal of industry standard dimensions, although the use of a higher psi rated hose for the lower psi rated hydraulic port is unusual. Since the visual differences between specialized connector and the industry normal connector are minimal, the specialized connector can be stamped with a marking 50 such as "61 to 62", which in the present instance represents a SAE Code 61 hose connection to a SAE Code 62 hydraulic port. It is considerably less expensive to have an inventory supply of the specialized connectors 10 than it is for the hydraulic unit manufacture to make specialized end castings for the hydraulic unit having various size hydraulic ports. Thus, specialized hydraulic hose connector provides an inexpensive alternative to specialized hydraulic units or the use of separate adaptor plates, while requiring no extra labor steps or sealing services and yet providing a high pressure connection as secure as previously encountered with standard hose end connectors.

I claim:

1. A connector for connecting a fluid conduit of a first code standard to a fluid port of a second code standard different than said first code standard and wherein said fluid conduit has a flange head dimensioned according to said first code standard, said fluid port is dimensioned according to said second code standard, said connector having an opening dimensioned according to said first code standard for receiving said fluid conduit flange head, and said connector having securing means positioned according to said second code standard and being adapted for connecting said connector to said fluid port.

2. The connector of claim 1 wherein said connector is formed by a pair of split flange clamp halves each having a semi-circular recess which together with the semi-circular recess of the other clamp half forms said connector opening receiving said fluid conduit flanged head.

3. The connector of claim 2 wherein each clamp half has at least two bolt receiving openings spaced according to the dimensions of said second code standard for said fluid port, and said securing means comprising bolts passing through said bolt receiving openings and into bolt receiving apertures formed in conjunction with said fluid port in accordance with the specifications of said second code standard.

4. The connector of claim 3 wherein the semi-circular recesses are dimensioned in accordance with SAE Code 61 and said bolt receiving openings are positioned in accordance with SAE Code 62.

5. A split flange connector adapted to secure a fluid conduit flange head configured according to a first code standard to a hydraulic port configured according to a second code standard different than said first code standard and wherein said split flange connector consists of a pair of split flange clamp halves each having a semi-circular recess adapted to mate with a portion of a flange head and having internal dimensions in accordance with said first code standard, each of said clamp halves also having a pair of bolt receiving opening which are spaced according to the dimensions required by said second code standard whereby a fluid conduit flange head dimensioned according to said first code standard can be directly mounted on a hydraulic port dimensioned according to said second code standard and secured by bolts passing through said bolt receiving opening in said clamp halves into bolt receiving apertures formed at said hydraulic port in accordance with said second code standard.

6. The split flange connector of claim 5 wherein said hydraulic port is formed in a hydrostatic transmission unit having a maximum pressure rating of a first predetermined pressure establishing the requirement for hydraulic ports in said transmission unit being dimensioned according to said second code standard and wherein said transmission unit is connected in hydraulic circuit by fluid conduits consisting of hydraulic hoses at a lower pressure rating and manufactured in accordance with said first code standard, said split flange connector securing the flanged head of one of said hoses to one of said hydraulic ports of said transmission unit.

7. The split flange connector of claim 6 wherein said hydraulic port and the size and placement of said clamp half bolt receiving openings are dimensioned according to SAE Code 62 standards and said flanged head and said semi-circular recesses of said clamp halves are dimensioned according to SAE Code 61 standards whereby a lower psi rated hose is connected to a 6,000 psi rated port by said split flange connector.

* * * * *